United States Patent
Zheng et al.

(10) Patent No.: US 12,265,407 B2
(45) Date of Patent: Apr. 1, 2025

(54) METHOD FOR CORRECTING POINTING ERRORS OF BIAXIAL ROTATION SYSTEM BASED ON SPHERICAL CAP FUNCTION

(71) Applicant: Nanjing Institute of Astronomical Optics & Technology, National Astronomical Observatories, CAS, Jiangsu (CN)

(72) Inventors: Yi Zheng, Jiangsu (CN); ying Li, Jiangsu (CN); Zhaoxiang Wu, Jiangsu (CN); Bin Liang, Jiangsu (CN); Lifeng Tang, Jiangsu (CN)

(73) Assignee: NANJING INSTITUTE OF ASTRONOMICAL OPTICS & TECHNOLOGY, NATIONAL ASTRONOMICAL OBSERVATORIES, CAS, Jiangsu (CN)

( * ) Notice: Subject to any disclaimer, the term of this patent is extended or adjusted under 35 U.S.C. 154(b) by 509 days.

(21) Appl. No.: 17/775,472

(22) PCT Filed: Sep. 14, 2020

(86) PCT No.: PCT/CN2020/115069
§ 371 (c)(1),
(2) Date: May 9, 2022

(87) PCT Pub. No.: WO2021/063170
PCT Pub. Date: Apr. 8, 2021

(65) Prior Publication Data
US 2022/0404844 A1   Dec. 22, 2022

(30) Foreign Application Priority Data
Sep. 30, 2019   (CN) .......................... 201910938906.0

(51) Int. Cl.
*G01S 3/786*   (2006.01)
*G05D 3/20*   (2006.01)
*G06F 17/15*   (2006.01)

(52) U.S. Cl.
CPC .............. *G05D 3/20* (2013.01); *G01S 3/7867* (2013.01); *G06F 17/15* (2013.01)

(58) Field of Classification Search
None
See application file for complete search history.

(56) References Cited

U.S. PATENT DOCUMENTS

2015/0028195 A1\*   1/2015   King ................ B29D 11/00461
                                                                       156/308.2

\* cited by examiner

*Primary Examiner* — Roy Y Yi
(74) *Attorney, Agent, or Firm* — MUNCY, GEISSLER, OLDS & LOWE, P.C.

(57) ABSTRACT

The invention discloses a method for correcting the pointing errors of a biaxial rotation system based on the spherical cap function, comprising: error collection: selecting stars or radio sources distributed evenly in a star catalogue for tracking and observation to obtain the theoretical position and measurement position of the stars, and subtracting the measurement positions and the theoretical positions to obtain the error distribution; error model fitting: selecting a suitable orthogonal spherical cap function for the obtained error distribution and performing fitting to calculate an error fitting coefficient, the orthogonal spherical cap function model comprising a hemispheric harmonic function HSH, a Zernike spherical cap function ZSF, and a longitudinal spherical cap function LSF; and error control and compensation: putting the error model and the related fitting coefficient into a pointing control system for compensation. In the present method for correcting the pointing errors of a biaxial rotation system based on a spherical cap function, the model has strong stability and is not easily affected by (Continued)

measurement noise; there is no need to determine the form of the model on the bases of the frame form of the telescope, and the correction accuracy is high.

9 Claims, 2 Drawing Sheets

METHOD FOR CORRECTING POINTING ERRORS OF BIAXIAL ROTATION SYSTEM BASED ON SPHERICAL CAP FUNCTION

TECHNICAL FIELD

The invention belongs to the field of precise positioning and pointing, and specifically relates to the pointing error correction of a biaxial rotation system, including error collection, modeling and correction of distribution error using spherical cap function.

TECHNICAL BACKGROUND

The "biaxial rotation system" has many applications in practical engineering, such as the azimuth rotation axis and height rotation axis of the plane-type optical (radio) telescope and the photoelectric theodolite. Due to machining accuracy, assembly error and other reasons, there will always be a certain difference between the direction reading of the biaxial rotation system and the ideal position, which is called the direction error. Pointing error has a great influence on the performance of the biaxial rotation system: for the telescope, it shows that the observed object is not in the center of the field of view or out of the field of view, which affects the observation effect. For theodolite, pointing error affects the accuracy of angle measurement and ranging. On the numerical control five-axis machine tool, the pointing error of double swing milling head directly affects the shape accuracy of workpiece processing.

By measuring the pointing error of the twin-axis rotation system in all directions, establishing the pointing error model, and using the error model in the control system to modify, the pointing accuracy will be significantly improved. In the aspect of pointing error acquisition and correction control, there are relatively perfect solutions, but pointing error model still needs to be studied. First, the pointing model is a mathematical expression of the distribution of pointing errors on the spherical crown to realize the following functions:

(1) Interpolation of data: the number of points with specific error measurement is very limited. In practical application, it is often necessary to obtain the pointing error between measurement points without measured values. In this case, a continuous mathematical model with errors is needed to obtain the error value of the position without measured data inside through interpolation.

(2) compression of data: table is used to record the position and value of all error measurements. This table method has a large amount of data, and there is no uniform expression for the number and distribution of test data, which is extremely inconvenient to use.

The requirement of pointing error model is to provide higher fitting accuracy. The current pointing model is still insufficient in the above aspects:

(1) Spherical harmonic function model: spherical harmonic function is a complete set of orthogonal functions on the whole sphere. As the orientation range of the biaxial rotation system only covers a part of the sphere (spherical crown), the normal equation conditions used in fitting model parameters are very large, with poor stability and easy to be affected by measurement noise.

(2) Basic parameter model: compared with the spherical harmonic function model, the calculation is relatively stable, but the form of the model needs to be determined according to the frame form of the telescope, and fewer parameters are considered, which will affect the accuracy of correction;

(3) Rack model: it is an extension of the basic parameter model, with high accuracy. The disadvantage is that it is not as stable as the basic parameter model.

SUMMARY OF THE INVENTION

In order to solve the problem of the above model, the present invention provides a correction method for the pointing error of the biaxial rotation system based on the spherical cap function. The specific technical scheme is as follows:

Method for correcting the pointing error of a biaxial rotation system based on the spherical cap function, comprising:

Error collection: selecting stars or radio distributed evenly in a star catalogue for tracking and observation to obtain the theoretical position and measurement position of the stars, and subtracting the measurement positions and the theoretical positions to obtain the error distribution; for the small twin-axis rotating system such as double swing milling head, the error distribution on the spherical cap is measured by laser tracker;

Error model fitting: selecting a suitable orthogonal spherical cap function for the obtained error distribution and performing fitting to calculate an error fitting coefficient; the orthogonal spherical cap function model comprising a hemispheric harmonic function HSH, a Zernike spherical cap function ZSF and a longitudinal spherical cap function LSF;

Error control and compensation: putting the error model and the related fitting coefficient into a pointing control system for compensation.

Further, the method specifically includes the following steps:

S1, Error collecting;

S2, Determining the maximum zenith angle and the fitting function;

The maximum zenith angle was determined, and the error obtained in step S1 was fitted using the orthogonal spherical cap function model to calculate the error fitting coefficient S3, Calculating the error fitting and the fitting coefficient was obtained;

S4, Obtaining the pointing error model;

S5, Putting it into the control system for error correction.

Further, step S1 includes:

S1-1, Selecting theoretical value

Spherical crown is divided into s bins (optimizing evenly divided), measured in each bin, Zenith direction Band azimuth direction $\phi$ and the radial direction of the theoretical value r can be got.

S1-2, The experimental equipment is used for testing and the measured value is obtained;

S1-3, The theoretical and experimental values are subtracted to obtain the pointing error.

Further, step S2 includes:

S2-1, Selecting the ith orthogonal spherical cap function model function;

S2-2, Determining the corresponding angle to the jth direction ($1 \leq j \leq s$);

S2-3, Calculating the ith function value $h_i^j$ to form the fitting matrix.

Further, step S2 includes:

(1) Hemispheric harmonic function:

$$HSH_n^m(s,\varphi) = (-1)^{|m|}\sqrt{\frac{(2n+1)}{2}\frac{(n-|m|)!}{(n+|m|)!}} \cdot P_n^{|m|}\{\cos(\theta)\} \cdot \Phi_m(\varphi),$$

$$\begin{pmatrix} n=0,2,4,\cdots\;;m=0,\pm2,\cdots,\pm n \\ n=1,3,5,\cdots\;;m=\pm1,\pm3,\cdots,\pm n \end{pmatrix}$$

Among $$P_n^{|m|}(x) = \frac{(-1)^{|m|}}{2^n n!}(1-x^2)^{\frac{|m|}{2}}\left(\frac{d}{dx}\right)^{n+|m|}(x^2-1)^n,$$

HSH is a complete set of orthogonal functions on a hemispheric plane;

(2) Zernike Spherical cap function ZSF:

$$ZSF_n^m(t,\varphi) = \sqrt{2(n+1)} \cdot R_n^m(t) \cdot \Phi_m(\varphi),$$

$$\begin{pmatrix} n=0,2,4,\cdots\;;m=0,\pm2,\cdots,\pm n \\ n=1,3,5,\cdots\;;m=\pm1,\pm3,\cdots,\pm n \end{pmatrix}$$

Among $t = \sin(\theta/2)/\sin(\theta_0/2),$ $$R_n^m(t) = \sum_{k=0}^{(n-|m|)/2} \frac{(-1)^k(n-k)!}{k!\left(\frac{n+|m|}{2}-k\right)!\left(\frac{n-|m|}{2}-k\right)!}t^{n-2k},$$

is a complete set of orthogonal functions on the spherical cap, $\theta_0$ is the maximum Zenith angle of the spherical crown $(0<\theta_0<\pi)$;

(3) Longitudinal spherical cap function LSF:

$$LSF_n^m(w,\varphi) = \sqrt{\frac{2^{|m|+2.5}}{\gamma_\nu^{(a,b)}}}\, w^{|m|}J\left(\frac{n-|m|}{2},0,\frac{2|m|-1}{2},2w^2-1\right)\cdot\Phi_m(\varphi),$$

$$\begin{pmatrix} n=0,2,\cdots\;;m=0,\pm2,\cdots,\pm n \\ n=1,3,\cdots\;;m=\pm1,\pm3,\cdots,\pm n \end{pmatrix}$$

Among, $w = [1-\cos(\theta)]/[1-\cos(\theta_0)] J(v,a,b,x) =$ $$\frac{1}{v!}\sum_{k=0}^{v}\frac{(-v)_k(a+b+v+1)_k(a+k+1)_{v-k}}{k!}\left(\frac{1-x}{2}\right)^k,$$

LSF is a complete set of orthogonal functions on a spherical crown with a maximum Zenith angle $\theta_0$.

Further, step S2 includes: selection of maximum Zenith angle $\theta_0$: the maximum range of use for the height axis in a two-axis rotation system should be selected. When $\theta_0$ less than 90 degrees, the fitting function can choose the hemispheric harmonic function, or Zernike spherical cap function ZSF, or longitudinal spherical cap function LSF.

Further, the step S3 includes obtaining a coefficient in the direction of the Zenith angle $\theta$, a coefficient in the direction of the Azimuth angle $\phi$, and a coefficient in the radial r direction.

Further, the said step S4 includes obtaining the error model of Angle theta direction, obtaining the error model of Azimuth angle $\phi$ direction, and obtaining the error model of radial r direction.

Further, step S5 includes:

S5-1, Getting pointing command;

S5-2, Substituting the pointing command into the pointing error model of Zenith angle to obtain the pointing error of Zenith angle;

S5-3, Fixing zenith pointing command;

S5-4, Putting the modified command into the control system for execution.

The present invention has the following beneficial effects:

The model stability is strong and less susceptible to the effects of measurement noise adopting the method of the invention. There is no need to determine the form of the model according to the telescope rack form, and the correction accuracy is high.

DETAILED DESCRIPTION

The following is a further detailed description of the invention in combination with the attached drawings.

The method of the invention is applicable in two situations:

(1) If the area covered by the error model is smaller than the hemisphere, HSH, ZSF and LSF can be used.

(2) If the error model covers more than one hemisphere, both ZSF and LSF can be used, and the maximum Zenith angle $\theta_0$ can be determined according to the distribution of error data.

For convenience, the following discussion takes HSH as an example (ZSF and LSF are used in the same way as HSH)

Figure 1:
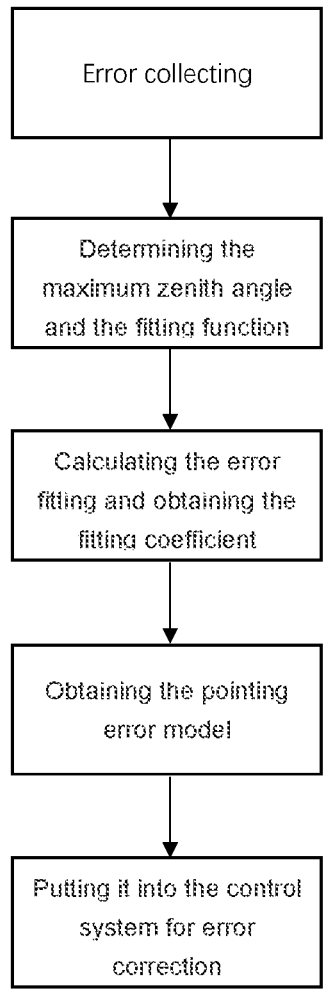
FIG. 1 is the control flow chart of the method of the invention.

The method and steps of the invention are shown in FIG. 1, including:

Step 1: error collection

Step 1-1 Selecting the theoretical value

Spherical crown is divided into s bins (optimizing evenly divided), measured in each bin, Zenith direction Band azimuth direction $\phi$ and the radial direction of the theoretical value r can be got:

$$\begin{cases} \Theta = [\,\theta_1 \;\; \theta_2 \;\; \cdots \;\; \theta_s\,]^T \\ \Phi = [\,\varphi_1 \;\; \varphi_2 \;\; \cdots \;\; \varphi_s\,]^T \\ R = [\,r_1 \;\; r_2 \;\; \cdots \;\; r_s\,]^T \end{cases}$$

Step 1-2 Testing with the experimental equipment to obtain the measured value $$\begin{cases} \tilde\Theta = [\,\tilde\theta_1 \;\; \tilde\theta_2 \;\; \cdots \;\; \tilde\theta_s\,]^T \\ \tilde\Phi = [\,\tilde\varphi_1 \;\; \tilde\varphi_2 \;\; \cdots \;\; \tilde\varphi_s\,]^T \\ \tilde R = [\,\tilde r_1 \;\; \tilde r_2 \;\; \cdots \;\; \tilde r_s\,]^T \end{cases}$$

Step 1-3 Subtracting the theoretical value from the experimental value to obtain the pointing error:

$$\begin{cases} d\Theta = \Theta - \tilde{\Theta} \\ d\Phi = \Phi - \tilde{\Phi} \\ dR = R - \tilde{R} \end{cases}$$

Step 2: error model fitting

The error distribution obtained above is selected to fit the orthogonal spherical cap function model, and the error fitting coefficient was calculated. The orthogonal spherical cap function model includes HSH (Hemi-Spherical Harmonics), ZSF (Zernike Spherical Function) and LSF (Longitudinal Spherical Function).

(1) the analytical expression formula of HSH is as follows:

$$HSH_n^m(s, \varphi) = (-1)^{|m|}\sqrt{\frac{(2n+1)}{2}\frac{(n-|m|)!}{(n+|m|)!}} \cdot P_n^{|m|}\{\cos(\theta)\} \cdot \Phi_m(\varphi),$$

$$\begin{pmatrix} n = 0, 2, 4, \cdots ; m = 0, \pm 2, \cdots, \pm n \\ n = 1, 3, 5, \cdots ; m = \pm 1, \pm 3, \cdots, \pm n \end{pmatrix}$$

Among, $P_n^{|m|}$ is the Associated Legendre Polynomial (Associated Legendre Polynomials) Here are the expressions:

$$P_n^{|m|}(x) = \frac{(-1)^{|m|}}{2^n n!}(1-x^2)^{\frac{|m|}{2}}\left(\frac{d}{dx}\right)^{n+|m|}(x^2-1)^n$$

HSH is a complete set of orthogonal functions on a hemispheric plane.

(2) The analytic expression of Zernike spherical cap function ZSF:

$$ZSF_n^m(t, \varphi) = \sqrt{2(n+1)} \cdot R_n^m(t) \cdot \Phi_m(\varphi),$$

$$\begin{pmatrix} n = 0, 2, 4, \cdots ; m = 0, \pm 2, \cdots, \pm n \\ n = 1, 3, 5, \cdots ; m = \pm 1, \pm 3, \cdots, \pm n \end{pmatrix}$$

Among, $t = \sin(\theta/2)/\sin(\theta_0/2)$. $R_n^m(t)$ is the Zernike polynomial, here is the expression:

$$R_n^m(t) = \sum_{k=0}^{(n-|m|)/2} \frac{(-1)^k(n-k)!}{k!\left(\frac{n+|m|}{2}-k\right)!\left(\frac{n-|m|}{2}-k\right)!} t^{n-2k},$$

ZSF is a complete set of orthogonal functions on a spherical crown with a maximum Zenith angle $\theta_0$.

(3) Longitudinal spherical cap function LSF:

$$LSF_n^m(w, \varphi) = \sqrt{\frac{2^{|m|+2.5}}{\gamma_v^{(a,b)}}} w^{|m|} J\left(\frac{n-|m|}{2}, 0, \frac{2|m|-1}{2}, 2w^2-1\right) \cdot \Phi_m(\varphi),$$

$$\begin{pmatrix} n = 0, 2, \ldots ; m = 0, \pm 2, \ldots, \pm n \\ n = 1, 3, \ldots ; m = \pm 1, \pm 3, \ldots, \pm n \end{pmatrix}$$

Among, $$w = [1-\cos(\theta)]/[1-\cos(\theta_0)]J(v, a, b, x) =$$

$$\frac{1}{v!}\sum_{k=0}^{v}\frac{(-v)_k(a+b+v+1)_k(a+k+1)_{v-k}}{k!}\left(\frac{1-x}{2}\right)^k,$$

LSF is a complete set of orthogonal functions on a spherical crown with a maximum Zenith angle $\theta_0$.

Selection of maximum Zenith angle $\theta_0$: the maximum range of use for the height axis in a two-axis rotation system should be selected. When $\theta_0$ less than 90 degrees, the fitting function can choose the hemispheric harmonic function, or Zernike spherical cap function ZSF, or longitudinal spherical cap function LSF.

S2-1, Selecting the ith HSH: $HSH_i$ ($1 \leq i \leq N$);
S2-2, Determining the corresponding angle $(\theta_j, \sim_j)$ to the jth direction ($1 \leq j \leq s$);
S2-3, Calculating the function value $h_i^j$ to the jth direction to form fitting matrix H.

$$H = \begin{bmatrix} h_1^1 & h_2^1 & \ldots & h_N^1 \\ h_1^2 & h_2^2 & \ldots & h_N^2 \\ \vdots & \vdots & \ddots & \vdots \\ h_1^s & h_2^s & \ldots & h_N^s \end{bmatrix}_{s \times N}$$

Step 3: Calculating the coefficients in the fitting model
Step 3-1 Calculating the coefficient of Zenith angle $\theta$ $$\vec{A} = [a_1\ a_1\ \ldots\ a_N]^T = (H^TH)^{-1}H^T(d\Theta)$$

Step 3-2 Calculating the coefficient of azimuth angle $\phi$ $$\vec{B} = [b_1\ b_2\ \ldots\ b_N]^T = (H^TH)^{-1}H^T(d\Phi)$$

Step 3-3 Calculating the coefficient of radial direction r $$\vec{C} = [c_1\ c_2\ \ldots\ c_N]^T = (H^TH)^{-1}H^T(dR)$$

Step 4: Obtaining the pointing error model
Step 4-1 The error model to direction $\theta$ of Zenith angle is as follows:

$$E_\theta(\theta, \varphi) = \sum_{i=1}^{N} a_i \cdot HSH_i(\theta, \varphi)$$

Step 4-2 The error model to direction $\phi$ of Azimuth angle is as follows:

$$E_\varphi(\theta, \varphi) = \sum_{i=1}^{N} b_i \cdot HSH_i(\theta, \varphi)$$

Step 4-3 The error model to radical direction r is as follows:

$$E_r(\theta, \varphi) = \sum_{i=1}^{N} c_i \cdot HSH_i(\theta, \varphi)$$

Figure 2:
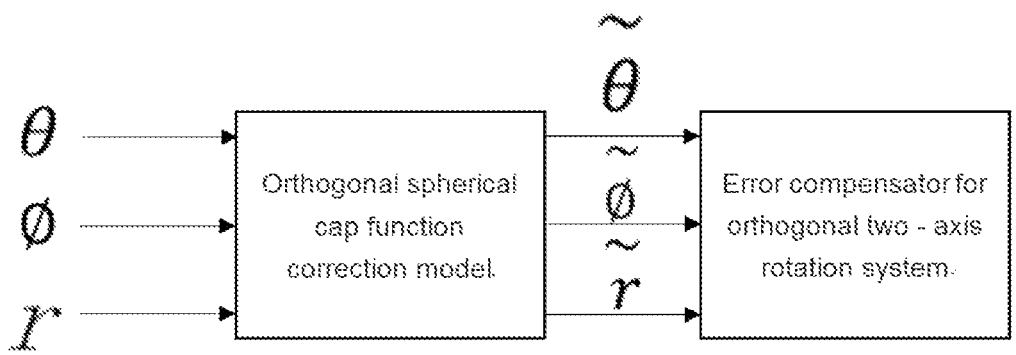
FIG. 2 is a schematic diagram of the correction model of spherical cap function.
Figure 3:
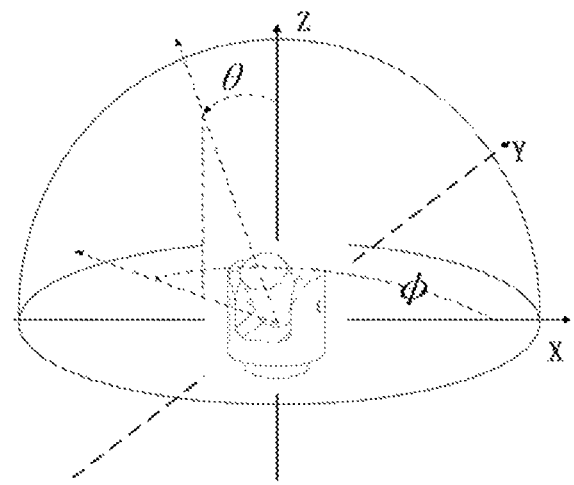
FIG. 3 is a schematic diagram of the orthogonal biaxial rotation system.
Figure 4:
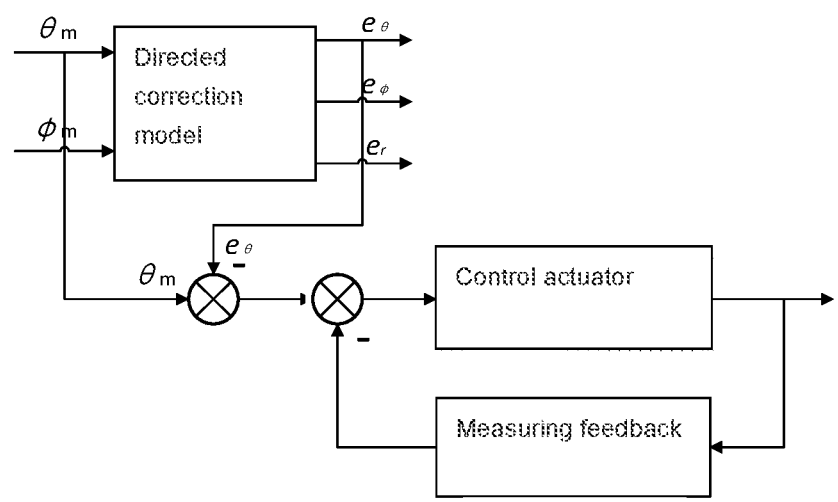
FIG. 4 is the schematic diagram of correction of pointing through pointing error model.

Step 5: Error correction by putting in the pointing control system, as shown in FIG. 2-3.

Taking Zenith angle $\theta$ as an example, correction is made through pointing error model.

Step 5-1 Getting pointing command $(\theta_m, \varphi_m)$;

Step 5-2 The pointing command is substituted into the pointing error model of Zenith angle, and the pointing error of Zenith angle is calculated:

$$e_\theta = \sum_{i=1}^{N} a_i \cdot HSH_i(\theta_m, \varphi_m)$$

Step 5-3 Fixed zenith pointing command:

$$\hat{\theta}_m = \theta_m - e_\theta$$

Step 5-4 Put the modified command into the control system for execution. See FIG. 5 for the specific block diagram.

Step 6: Put in the pointing control system for error correction

The azimuth flow is the same.

The correction of radial r is more complicated than Azimuth angle and Zenith angle, so it cannot be directly corrected. In five-axis numerical control equipment, its correction should be compensated by linear motion in three directions (X, Y, Z), and the formula is as follows:

$$e_r = \sum_{i=1}^{N} c_i \cdot HSH_i(\theta_m, \varphi_m)$$

$$\begin{cases} e_x = e_r \cdot \sin(\theta_m)\cos(\varphi_m) \\ e_y = e_r \cdot \sin(\theta_m)\sin(\varphi_m) \\ e_z = e_r \cdot \cos(\theta_m) \end{cases}$$

Then put in the control system of X, Y and Z for correction;

As mentioned above is only a relatively good embodiment of the invention and is not used to restrict the invention. Any modification, equivalent replacement and improvement etc. made within the spirit and principles of the invention shall be included in the protection scope of the invention.

We claim:

1. A method for correcting pointing errors of a biaxial rotation system based on a spherical cap function, wherein the biaxial rotation system includes an azimuth rotation axis and a height rotation axis and a pointing control system controlling motions of the azimuth rotation axis and the pointing control system, the method comprising:
   collecting errors, comprising measuring and obtaining an error distribution;
   fitting an error model, comprising selecting an orthogonal spherical cap function for the obtained error distribution and performing fitting to calculate an error fitting coefficient; the orthogonal spherical cap function model comprising a hemispheric harmonic function (HSH), a Zernike spherical cap function (ZSF) and a longitudinal spherical cap function (LSF);
   controlling and compensating the error, comprising putting the error model and the related fitting coefficient into the pointing control system to controlling motions of the azimuth rotation axis and the pointing control system and compensating the pointing errors of the biaxial rotation system.

2. The method for correcting the pointing errors of the biaxial rotation system based on the spherical cap function according to claim 1, wherein the step of fitting the error model comprises:
   determining a maximum zenith angle and a fitting function; and fitting the errors obtained in the step of collecting errors by using the orthogonal spherical cap function model to calculate an error fitting coefficient;
   calculating the error fitting and obtaining the error fitting coefficient;
   obtaining and pointing error model.

3. The method for correcting the pointing errors of the biaxial rotation system based on the spherical cap function according to claim 2, wherein the step of collecting errors comprises:
   selecting theoretical value; wherein a spherical crown is divided into s bins, measured in each bin, Zenith direction$\theta$ and azimuth direction$\Phi$ and the radial direction of the theoretical value r is obtained; testing and obtaining measured values;
   obtaining the pointing errors by subtracting theoretical and experimental values.

4. The method for correcting the pointing errors of the biaxial rotation system based on the spherical cap function according to claim 2, wherein the step of determining a maximum zenith angle and the fitting function comprises:
   selecting the ith orthogonal spherical cap function model function;
   determining the corresponding angle to the jth direction ($1 \leq j \leq s$);
   calculating the ith function value $h_i^j$.

5. The method for correcting the pointing errors of the biaxial rotation system based on the spherical cap function according to claim 2, wherein in the step of determining a maximum zenith angle and the fitting function:
   (1) the hemispheric harmonic function (HSH):

$$HSH_n^m(s, \varphi) = (-1)^{|m|} \sqrt{\frac{(2n+1)(n-|m|)!}{2(n+|m|)!}} \cdot P_n^{|m|}\{\cos(\theta)\} \cdot \Phi_m(\varphi),$$

$$\begin{pmatrix} n = 0, 2, 4, \ldots ; m = 0, \pm 2, \ldots, \pm n \\ n = 1, 3, 5, \ldots ; m = \pm 1, \pm 3, \ldots, \pm n \end{pmatrix}$$

Where, $$P_n^{|m|}(x) = \frac{(-1)^{|m|}}{2^n n!}(1-x^2)^{\frac{|m|}{2}}\left(\frac{d}{dx}\right)^{n+|m|}(x^2-1)^n,$$

HSH is a complete set of orthogonal functions on a hemispheric plane;

(2) the Zernike Spherical cap function (ZSF):

$$ZSF_n^m(t, \varphi) = \sqrt{2(n+1)} \cdot R_n^m(t) \cdot \Phi_m(\varphi),$$

$$\begin{pmatrix} n = 0, 2, 4\ldots ; m = 0, \pm 2, \ldots, \pm n \\ n = 1, 3, 5\ldots ; m = \pm 1, \pm 3, \ldots, \pm n \end{pmatrix}$$

among, $$t = \sin(\theta/2)/\sin(\theta_0/2),$$

$$R_n^m(t) = \sum_{k=0}^{(n-|m|)/2} \frac{(-1)^k (n-k)!}{k!\left(\frac{n+|m|}{2}-k\right)!\left(\frac{n-|m|}{2}-k\right)!} t^{n-2k},$$

ZSF is a complete set of orthogonal functions on the spherical cap, $\theta_0$ is the maximum Zenith angle of the spherical crown ($0<\theta_0<\pi$);

(3) the longitudinal spherical cap function (LSF):

$$LSF_n^m(w, \varphi) = \sqrt{\frac{2^{|m|+2.5}}{\gamma_v^{(a,b)}}} w^{|m|} J\left(\frac{n-|m|}{2}, 0, \frac{2|m|-1}{2}, 2w^2-1\right) \cdot \Phi_m(\varphi),$$

$$\begin{pmatrix} n=0, 2, \ldots \,; m=0, & \pm 2, \ldots, & \pm n \\ n=1, 3, \ldots \,; m=\pm 1, & \pm 3, \ldots, & \pm n \end{pmatrix}$$

among, $$w = [1-\cos(\theta)]/[1-\cos(\theta_0)] \quad J(v, a, b, x) =$$

$$\frac{1}{v!}\sum_{k=0}^{v} \frac{(-v)_k(a+b+v+1)_k(a+k+1)_{v-k}}{k!}\left(\frac{1-x}{2}\right)^k ZSF$$

is a complete set of orthogonal functions on the spherical cap, $\theta_0$ is the maximum Zenith angle of the spherical crown ($0<\theta_0<\pi$).

6. The method for correcting the pointing errors of the biaxial rotation system based on the spherical cap function according to claim 2, wherein in the step of determining a maximum zenith angle and the fitting function, the maximum Zenith angle $\theta_0$ is the maximum use range of the height rotation axis in the biaxial rotation system; when $\theta_0<90°$, the fitting function is the hemispheric harmonic function (HSH) or the Zernike spherical cap function (ZSF) or the Longitudinal spherical cap function (LSF); when $\theta_0>90°$, the fitting function is the Zernike spherical cap function (ZSF), or the Longitudinal spherical cap function (LSF).

7. The method for correcting the pointing errors of the biaxial rotation system based on the spherical cap function according to claim 2, wherein the step of calculating the error fitting and obtaining the error fitting coefficient comprising: obtaining the Zenith direction $\theta$ and azimuth direction $\Phi$ and the radial direction of the theoretical value r.

8. The method for correcting the pointing errors of the biaxial rotation system based on the spherical cap function according to claim 2, wherein the step of obtaining and the pointing error model comprising: obtaining the Zenith direction $\theta$ and azimuth direction $\Phi$ and the radial direction of the theoretical value r.

9. The method for correcting the pointing errors of the biaxial rotation system based on the spherical cap function according to claim 2, wherein the step of controlling and compensating the errors comprising:
 obtaining a pointing command;
 substituting the pointing command into the pointing error model of the Zenith angle to obtain the pointing error of the Zenith angle;
 modifying a Zenith pointing command;
 putting the modified Zenith command into the pointing control system for execution.

* * * * *